United States Patent Office 2,723,906
Patented Nov. 15, 1955

2,723,906

STABILIZED HYDROCARBON FUEL OIL

Dilworth T. Rogers, Summit, and Harry W. Rudel, Roselle Park, N. J., assignors to Esso Research and Engineering Company, a corporation of Delaware No Drawing. Application November 13, 1950, Serial No. 195,472

4 Claims. (Cl. 44—62)

This invention concerns a novel composition consisting of a fuel oil containing hydrocarbons derived from cracking operations and particular compounds as stabilizers for the oil. The compounds to be employed as stabilizers consist of the mixture of lecithin and a polymer of alkyl phenol, ammonia, and formaldehyde.

This invention broadly concerns hydrocarbon mixtures known as "fuel oils." Such hydrocarbon mixtures are employed in various burner systems, as diesel fuels, or as domestic and industrial heating oils. Fuel oils may be derived from petroleum by a variety of methods including straight distillation from crude petroleum oil, and thermal or catalytic cracking of petroleum oil fractions.

It has been found that fuel oils consisting completely or in part of cracked stocks are characterized by an undesirable instability, giving rise to the formation of sediment. As a result, such fuel oils may cause clogging of filters, orifices, or conduits associated with the burning systems in which they are employed.

In accordance with this invention it has been established that instability of cracked heating oils may be substantially overcome by incorporating a combination of a phosphatide such as lecithin and a polymer of alkyl phenol, ammonia, and formaldehyde in the unstable heating oils. These two specific compounds when employed in combination are in some way effective in co-acting so that relatively minor proportions of the two effectively stabilize a heating oil.

Heating oils which may be stabilized by these additives are hydrocarbon mixtures of which more than about 10% consist of stocks derived from thermal or catalytic cracking operations. More precisely still, the base stocks may be characterized as petroleum fractions containing a proportion of cracked stocks greater than 10% and falling within A. S. T. M. specification D–975–48T for Diesel Fuel Oils (Grades No. 1–D to 4–D inclusive) and A. S. T. M. specification D–396–48T for Fuel Oils (Grades No. 1 to 6 inclusive).

With reference first, to the polymer of alkyl phenol, ammonia, and formaldehyde to be included, it may be noted that this is the type of compound disclosed in U. S. Patents Nos. 2,453,850 and 2,334,594. Such polymers may be prepared by condensing an alkyl phenol with formaldehyde in the presence of a hydrogen halide. The phenolic condensation product is then reacted with a strong base such as an amino compound although preferably with ammonia. Very little halogen, and preferably none, is left in the final product.

As in the case of many resin preparations, the exact mechanism of the reaction is not entirely understood. In the first stage the alkyl phenol may be regarded as condensing with the reaction product of the hydrogen halide or aldehyde, or, as condensing with formaldehyde, and the condensation product thereof being condensed with the hydrogen halide. The resulting product of this reaction is a complex mixture of various chlormethyl derivatives, having the following general formula:

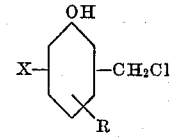

in which the substituent groups may be attached to any position of the aryl nucleus indicated diagrammatically by the hexagon, R represents a hydrocarbon group of at least 2 and preferably an alkyl group of 4 or more carbon atoms, and X represents hydrogen or an organic radical, especially an alkyl, aryl or aralkyl radical which may in turn contain substituent groups. Among the compounds which have been identified as present in the products from such reaction are the following:

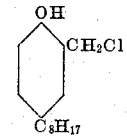

Chlormethyl diisobutyl phenol

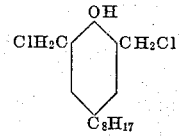

Bis chlormethyl diisobutyl phenol

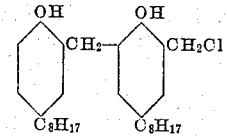

Chlormethyl bis (diisobutyl hydroxy phenyl) methane, and

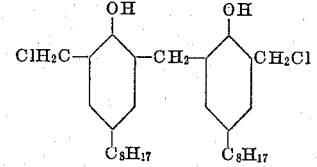

Bis (diisobutyl chlormethyl hydroxy phenyl) methane

In the second stage of reaction, the condensation products of the alkyl phenol, the formaldehyde, and the hydrogen halide split off halogen in undergoing a further condensation with the nitrogen base, and thus, the alkyl phenol radical becomes united with the base radical through the methylene (—CH₂—) group, thereby forming compounds containing the following characteristic group:

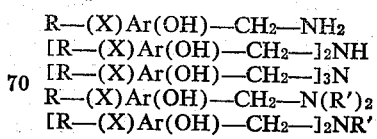

wherein, as before, R—Ar(OH)—represents the alkyl phenol group, X represents H or an organic group and the nitrogen atom N has valences which may be satisfied by hydrogen or organic radicals, (R'), which may represent alkyl, cycloalkyl, aryl, or a hydroxy alkyl benzyl radical, and which may represent similar or different radicals in the molecule, as for example, in the following types of compounds:

R—(X)Ar(OH)—CH₂—NH₂
[R—(X)Ar(OH)—CH₂—]₂NH
[R—(X)Ar(OH)—CH₂—]₃N
R—(X)Ar(OH)—CH₂—N(R')₂
[R—(X)Ar(OH)—CH₂—]₂NR'

The preferred compounds for use according to this invention are resinous condensation and polymerization products of materials having the characteristic structure

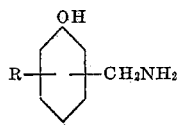

in which R is an alkyl group of 2 to 22 carbon atoms, the compounds having undergone a condensation or polymerization reaction as described above.

Another method of preparation which may be employed is to alkylate phenol to obtain alkylated phenol which is then reacted directly with ammonia and formaldehyde.

The product obtained by either of these methods of preparation may best be identified as the polymeric condensation product of ammonia, formaldehyde, and an alkyl phenol where the alkyl radical associated with the phenol molecule contains 2 to 22 carbon atoms. Alternatively the product may be defined as a polymeric alkyl hydroxy benzyl amine. The structural formula of such polymers has not been definitely ascertained.

The identified polymer is usually prepared as a concentrate of the active ingredient in a heavy oil vehicle and is commercially available in this form. In the data which follows in this specification it is to be understood however that while the polymer of alkyl phenol, ammonia, and formaldehyde is employed as this type of composition, in reporting the amount of material employed, the amount given corresponds to the actual weight of active ingredient and not to the weight of the composition including the vehicle.

With regard to the lecithin to be employed, it may be noted that lecithin is a monoamino-monophosphatide containing similar or dissimilar radicals corresponding to the radicals of stearic acid, palmitic acid or similar fatty acids. Lecithin, which is commercially available, is a mixture of compounds of the above-identified character.

As indicated, it has been found that when employing mixtures of polymeric alkyl hydroxy benzyl amine and lecithin, synergistic results are provided to effectively stabilize a fuel oil. As will be shown, it is particularly notable that small proportions of either of these compounds by themselves are not capable of effectively stabilizing a fuel oil and in fact have no advantageous effects whatever in stabilizing a fuel oil. However, in some manner, when employed together, small proportions of polymeric alkyl hydroxy benzyl amine and lecithin are peculiarly effective in stabilizing fuel oil. Due to this synergistic effect of these additives, it is presently contemplated that about equal proportions of the additives should be employed. Not more than about 0.05 weight percent of the combined additives are required, and generally, about 0.02 weight percent is effective in stabilizing heating oils. It is to be understood that other known additives may, if desired, be incorporated in the heating oil in the conventional manner. Thus if desired, constituents such as glycol and glycerine ethers and esters, phosphate and thiophosphate esters and partial esters, and other conventional additives may be employed in addition to the mixture of polymeric alkyl hydroxy benzyl amine and lecithin. It is particularly contemplated that rust inhibitors be included in the fuel oils of this invention. Examples of such rust inhibitors are the metal salts of naphthenic acids, sorbitan esters, and esters of pentaerythritol.

The nature of this invention will be fully understood from the following examples of the invention.

EXAMPLE I

A commercial heating oil was tested for stability as the oil was received and after addition of various types of additives to the oil. The oil was a blend consisting of 20 to 30% catalytically cracked stock, 50 to 40% thermally cracked stock, and 30% virgin stock. Typical inspections of this type of oil are as follows:

| | |
|---|---:|
| Grav. A. P. I. | 34.1 |
| Color, Tag Robinson | 11¾ |
| Flash ° F. | 158 |
| Sulfur (percent) | 0.56 |
| Aniline point ° F. | 130 |
| Neutralization No. | 0.07 |
| Dist. I. B. P. (° F.) | 342 |
| 10% | 420 |
| 50% | 484 |
| 90% | 576 |
| F. B. P. | 628 |
| Carbon residue on 10% bottoms (percent) | 0.82 |

In a series of additive tests which were conducted, a polymeric alkyl hydroxy benzyl amine alone was added to this heating oil, lecithin alone was added to the heating oil, and finally, different weight combinations of lecithin and polymeric alkyl hydroxy benzyl amine were added to the heating oil. The particular polymer employed was the reaction product of isooctyl phenol, ammonia, and formaldehyde. This compound is identified in the following table of data as polymeric isooctyl hydroxy benzyl amine. The resulting heating oil compositions were then tested for stability in a test in which the heating oil was stored in a glass bottle for a period of 16 hours while being maintained at a temperature of 210° F.

At the end of this time the heating oil was filtered; the amount of sludge accumulating during the storage period was then quantitatively determined. The results of these tests are indicated in the table below:

*Stability tests*

| Additive | Mg. Insolubles/600 g. |
|---|---:|
| None | 28 |
| 0.10% polymeric isooctyl hydroxy benzyl amine | 20 |
| 0.014% polymeric isooctyl hydroxy benzyl amine | 18 |
| 0.10% lecithin | 37 |
| 0.010% polymeric isooctyl hydroxy benzyl amine and 0.005% lecithin | 3 |
| 0.006% polymeric isooctyl hydroxy benzyl amine and 0.010% lecithin | 2 |
| 0.006% polymeric isooctyl hydroxy benzyl amine and 0.005% lecithin | 11 |

Referring to the table it will be noted that the untreated heating oil was of a nature to provide 28 mg. of sludge per 600 gms. of the heating oil during the 16 hour stability test. This is an amount of sediment formation which indicates an oil of unsatisfactory stability. When 0.010 wt. percent of lechithin is included in the heating oil, no improvement in stability is achieved, and in fact, the resulting sludge formation is somewhat worse than when no additive is employed. Similarly when 0.010% or 0.014%, by weight, of polymeric isooctyl hydroxy benzyl amine is included, relatively little improvement in the stability of the heating oil is obtained. However, when combinations of the polymeric isooctyl hydroxy benzyl amine and lecithin are employed in substantially the same total weight concentrations, the sludge formation is remarkably decreased, indicating that the oil has been substantially stabilized. This data therefore demonstrates the peculiarly effective manner in which minor proportions of lecithin and polymers of alkyl phenol, ammonia, and formaldehyde, in combination, stabilizes heating oil.

The foregoing data, demonstrating the efficiency of fuel oil stabilization in accordance with this invention, was verified by prolonged high temperature storage tests. In these tests heating oil, of the composition heretofore identified, containing small quantities of lecithin in combination with polymeric isooctyl hydroxy benzyl amine was stored at 150° F. for a period of 14 days. At the end of this time the insoluble matter which had accumulated was quantitatively determined and reported as milligrams of insoluble matter per 600 g. of heating oil. When employing 0.005% of lecithin with 0.010% of polymeric isooctyl hydroxy benzyl amine during the storage time, only 1 mg. of insoluble material was formed. When employing 0.01% of lecithin and 0.006% of polymeric isooctyl hydroxy benzyl amine, 5 mg. of insoluble material was formed. Finally, in employing 0.005% lecithin and 0.006% of polymeric isooctyl hydroxy benzyl amine, 6 mg. of insoluble material were formed per 600 g. of heating oil. This data again bears out the effective stabilization of heating oil achieved as compared to the unstabilized heating oil which formed 26 mg. of insoluble material when stored in the same manner.

What is claimed is:

1. A fuel oil composition consisting of a major proportion of hydrocarbons boiling in the heating oil boiling range including more than about 10% cracked stocks and a minor proportion of a synergistic combination of lecithin and an oil-soluble resinous auto-condensation product of an alkyl hydroxy benzyl amine having the general compositional formula

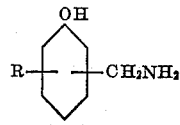

in which R represents an alkyl group having from 2 to 22 carbon atoms, said combination being present in an amount no more than about 0.02 wt. per cent of said composition but sufficient to inhibit sediment formation, said combination consisting of about 10 parts by weight of said lecithin per 6 to 20 parts of said auto-condensation product.

2. A composition as defined in claim 1 in which the alkyl group contains about 8 carbon atoms.

3. A composition as defined in claim 1 in which the alkyl group is an isooctyl group.

4. A composition as defined in claim 1 in which the combination consists of about equal proportions of lecithin and the auto-condensation product.

References Cited in the file of this patent

UNITED STATES PATENTS

| | | |
|---|---|---|
| 2,165,651 | Rees et al. | July 11, 1939 |
| 2,207,430 | Burk et al. | July 9, 1940 |
| 2,437,041 | Proell | Mar. 2, 1948 |
| 2,453,850 | Mikeska et al. | Nov. 16, 1948 |